US009389056B2

(12) United States Patent
Wood

(10) Patent No.: US 9,389,056 B2
(45) Date of Patent: Jul. 12, 2016

(54) HEIGHT MEASUREMENT SYSTEM

(71) Applicant: James L. Wood, Brighton, CO (US)

(72) Inventor: James L. Wood, Brighton, CO (US)

(*) Notice: Subject to any disclaimer, the term of this patent is extended or adjusted under 35 U.S.C. 154(b) by 99 days.

(21) Appl. No.: 14/150,693

(22) Filed: Jan. 8, 2014

(65) Prior Publication Data
US 2014/0202017 A1 Jul. 24, 2014

Related U.S. Application Data

(60) Provisional application No. 61/754,866, filed on Jan. 21, 2013.

(51) Int. Cl.
*G01B 3/20* (2006.01)
(52) U.S. Cl.
CPC ........................................ *G01B 3/20* (2013.01)
(58) Field of Classification Search
CPC .............. G01B 3/20; G01B 5/02; G01B 1/00; G01B 3/22; G01B 3/10; A61B 5/1072; A61B 5/107
USPC ............................................................ 33/512
See application file for complete search history.

(56) References Cited

U.S. PATENT DOCUMENTS

| 2,215,884 | A | * | 9/1940 | Runge | 33/512 |
|---|---|---|---|---|---|
| 4,118,868 | A | | 10/1978 | Johnson | |
| 4,134,212 | A | * | 1/1979 | Allen | 33/512 |
| 4,495,702 | A | | 1/1985 | Bergstedt | |
| 5,361,507 | A | * | 11/1994 | Lopez | 33/515 |
| D355,860 | S | | 2/1995 | Lund | |
| 5,402,585 | A | * | 4/1995 | Lund | 33/832 |
| 5,813,132 | A | | 9/1998 | Bodkin, Sr. | |
| 6,073,359 | A | * | 6/2000 | Lee | 33/759 |
| 6,226,881 | B1 | * | 5/2001 | Landauer | 33/515 |
| D444,082 | S | | 6/2001 | Lynberg | |
| 7,181,861 | B1 | * | 2/2007 | Leser | 33/832 |
| 7,891,106 | B2 | * | 2/2011 | Dunham | 33/512 |
| 8,539,690 | B2 | * | 9/2013 | Haykeen | 33/512 |
| 8,869,415 | B1 | * | 10/2014 | Haykeen | 33/512 |

(Continued)

FOREIGN PATENT DOCUMENTS

CN         01258925      9/2002

OTHER PUBLICATIONS

Google Translation of CN 01258925, 5 pp.

(Continued)

*Primary Examiner* — Yaritza Guadalupe-McCall
(74) *Attorney, Agent, or Firm* — Trenner Law Firm, LLC; Mark D. Trenner

(57) ABSTRACT

Example height measuring system includes a slide rack configured for mounting to a vertical wall surface and being vertically aligned. The height measurement system also includes a height measuring gauge. The height measuring gauge has a slide mount portion slidably mounted within the slide track, the slide mount portion being configured to travel essentially parallel to the vertical surface. The height measuring gauge also has a gauge plank hingedly mounted to the slide mount portion. The gauge plank is rotatable between a first plank position and a second plank position. The first plank position is parallel to the vertical surface, and the second plank position is perpendicular to the slide mount portion. The height measurement system also includes a backing sheet configured for mounting along a length of the backing sheet on the vertical wall surface and between the height measuring gauge and the vertical wall surface.

19 Claims, 5 Drawing Sheets

(56) References Cited

U.S. PATENT DOCUMENTS

| | | | |
|---|---|---|---|
| 2008/0034600 A1* | 2/2008 | Rabe | 33/512 |
| 2010/0223799 A1* | 9/2010 | Dunham | 33/512 |
| 2011/0167658 A1* | 7/2011 | Chul | 33/512 |
| 2012/0096726 A1* | 4/2012 | Glock, Jr. | 33/512 |
| 2012/0144686 A1* | 6/2012 | Haykeen | 33/512 |
| 2013/0091718 A1* | 4/2013 | Haykeen | 33/512 |
| 2014/0190029 A1* | 7/2014 | Blakely | 33/512 |
| 2014/0202017 A1* | 7/2014 | Wood | 33/512 |

OTHER PUBLICATIONS

English Abstract of CN01258925.X, 1 page.

* cited by examiner

US 9,389,056 B2

HEIGHT MEASUREMENT SYSTEM

This application claims priority to U.S. Provisional Application No. 61/754,866 titled "Wall-mounted height measurement system" of James L. Wood, filed on Jan. 21, 2013, hereby incorporated by reference for all that it discloses as though fully set forth herein.

BACKGROUND

There has been a long-term desire to measure the height of family members within the home environment. This is especially true in households with one or more growing children. In an effort to track growth, it has been typical for families to manually mark a child's (or other person's) height on a wall, using for example, a ruler, a book, or other flat object in an attempt to make a projection from a top of the child's head to the wall.

There are at least two problems associated with this sort of procedure for tracking height. First, the height marks, by being made on the wall, may eventually wear away or need to be painted over, making the wall an impractical means of storing a child's growth progress as a possible keepsake. Secondly, as it can be difficult to keep the ruler, book, or other flat object perpendicular to the wall and aligned on the topmost portion of their head and thus get a truly accurate marking of his/her height.

DETAILED DESCRIPTION

Figure 1:
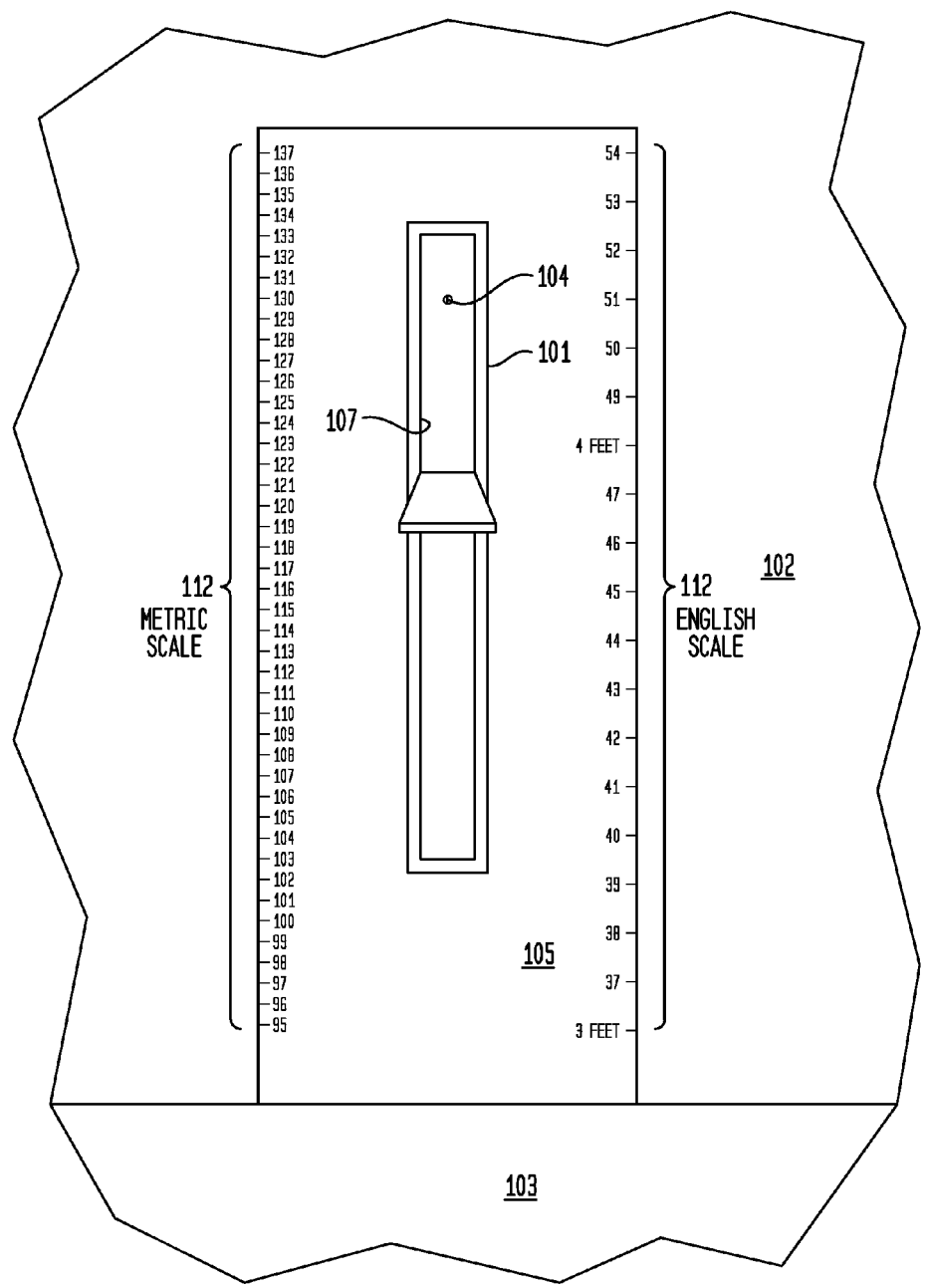
FIG. 1 is an illustration of an example height measurement system.

The systems and methods described herein provide a portable marking surface for measuring and tracking height. The height measurement system aids in both avoiding marking an actual wall, and enabling this growth information to be saved (and moved from room to room, or even house to house) as a keepsake. Additionally, the systems and methods allow for the quick and accurate measurement of height.

An example of the height measuring system includes a slide track, a height measuring gauge, and a backing sheet. The slide track is configured for mounting to a vertical surface and being aligned substantially perpendicular to a floor or other surface on which the child may stand.

The height measuring gauge incorporates a slide mount portion and a gauge plank. The slide mount portion is slidably mounted within the slide track, and the slide mount portion is configured to travel substantially parallel to a vertical surface (e.g., the wall) and substantially perpendicular to the floor or other surface. The gauge plank may be hingedly mounted to the slide mount portion.

The gauge plank may also be rotated between a first plank position and a second plank position. The first plank position is substantially parallel to the vertical surface (e.g., the wall) and the second plank position being essentially perpendicular to the slide mount portion.

In an example, the backing sheet is configured for mounting to the vertical surface and for being mounted between the height measuring gauge and the vertical surface (e.g., by pinning or otherwise fixing to the wall). The backing sheet may also be folded and/or rolled or otherwise collapsed for readily being carried between locations (e.g., from a wall in one room to a wall in another room) and/or for storage.

Before continuing, it is noted that as used herein, the terms "includes" and "including" mean, but is not limited to, "includes" or "including" and "includes at least" or "including at least." The term "based on" means "based on" and "based at least in part on." Further, the terms "vertical" and "vertically" are intended to be defined relative to a room or other environment in which the height measuring system is mounted and, more particularly, a "vertical" orientation is intended to be perpendicular or essentially perpendicular to the floor, ground, or other flat surface relative to which the height measuring system has been oriented. Additionally, it should be noted that the examples described herein are provided for purposes of illustration, and are not intended to be limiting. Other devices and/or device configurations may be utilized to carry out the operations described herein.

FIGS. 1-7 illustrate an example height measuring system. The example height measuring system is shown as it may include a slide track 101, a slide mount 106, a height measuring gauge plank 108, and a backing sheet 105 having a linear measurement scale thereon. As described above, the height measuring system may be used as a measuring device that is capable of being mounted to a wall (or another vertical surface 102) to facilitate measuring the height of children (and adults or others), e.g., at various ages or other times. The height measuring system may also serve to retain a record of that height.

Figure 2:
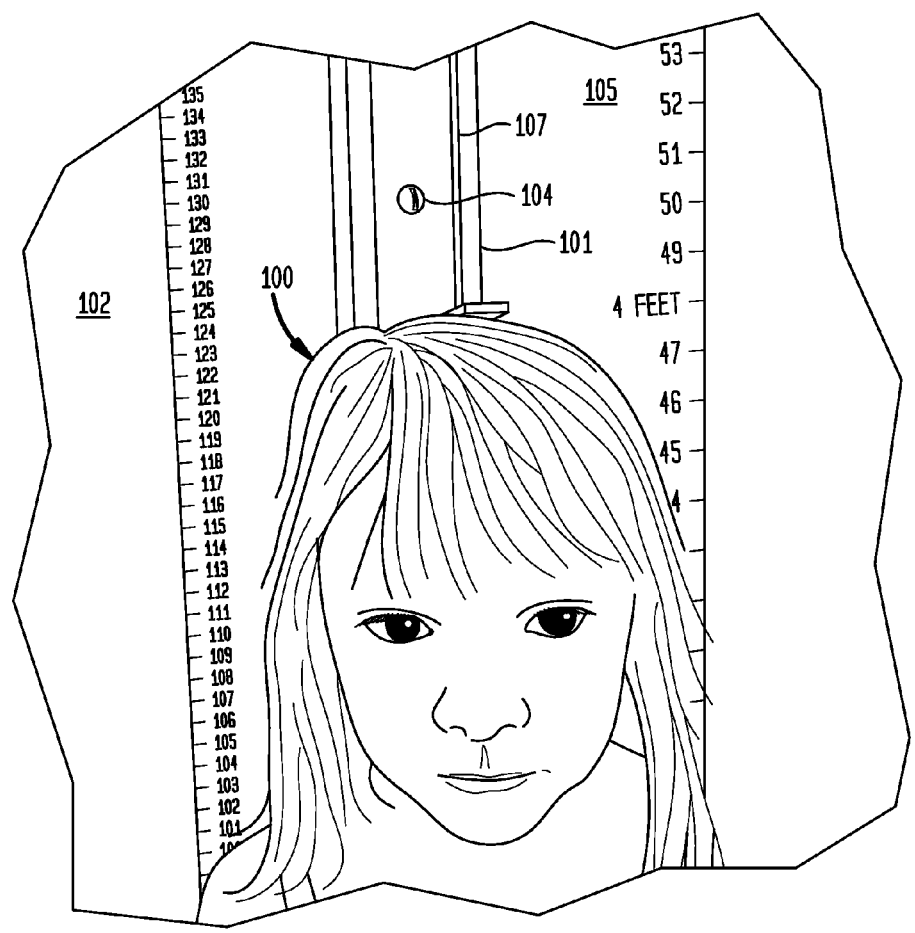
FIG. 2 is an illustration of an example height measurement system in use.

Operation or use of the height measuring system is illustrated in FIG. 2. In this example, the height measuring gauge plank 108 is moved by sliding the slide mount portion 106 along the slide track 101 to a point above the head of a person 100 to be measured. If moved while the person 100 to be measured is in place relative to the height measuring system, the height measuring gauge plank 108 may be at a position high enough to permit the gauge plank 108 to be moved (e.g., rotated) to the second plank position 111B (i.e., high enough to provide enough clearance for that rotation to take place) as seen in FIG. 2. In another example, the plank 108 may be moved or rotated downward.

When the gauge plank 108 is at a location at or above the head of the person being measured, the gauge plank 108 may be moved into contact with a person's 100 head. As such, a height of the person 100 can be determined using at least one of the height measurement scales 112. Information about the measurement (e.g., name, date, height mark, etc.) can be indicated/written on the backing sheet 105 relative to the height location measured.

As seen from FIGS. 1-5, the slide track 101 may be configured for mounting to a vertical surface 102 and oriented substantially vertically (e.g., perpendicular to a floor 103 or other surface) in a room or other environment in which it has been mounted.

It is to be understood that the surface relative to which the slide track is vertically oriented may also be the ground, a platform, or another substantially horizontal surface upon which an individual may stand upon and still facilitate a reasonably accurate height measurement to be made.

In the example shown in the drawings, slide track 101 is attached to the wall 102 by use of by at least one screw 104 or other elongate fastener (e.g., a bolt or nail). However, it is to be understood that the slide track 101 could be fastened directly to the wall by any suitable attachment means (e.g., stapling). Likewise, slide track 101 may be indirectly attached thereto, such as by being taped or otherwise adhered to the backing sheet 105, with the backing sheet being directly attached to the wall or other vertical surface. In other examples, the slide track 101 may simply be held in place, e.g., for temporary measurement.

The backing sheet 105 may be configured as an aid for charting a growth record. As seen in FIG. 2, a person 100 may stand with their back to the height measurement system to have their height determined. As also seen especially in FIGS. 3-5, a slide mount portion 106 is slidably mounted within a travel groove 107 of the slide track 101, and the slide mount portion 106 is configured to travel substantially parallel to the vertical surface and along a substantially vertical orientation (i.e., substantially perpendicular to the floor or other horizontal surface).

The slide mount portion 106 may be readily slidable relative to the slide track 101. Such a configuration facilitates reasonably precise alignment of a gauge plank 108 relative to the top of the head of a person 100 being measured. This configuration also allows easy movement over larger distances (e.g., between height locations of older and younger siblings).

Figure 3:
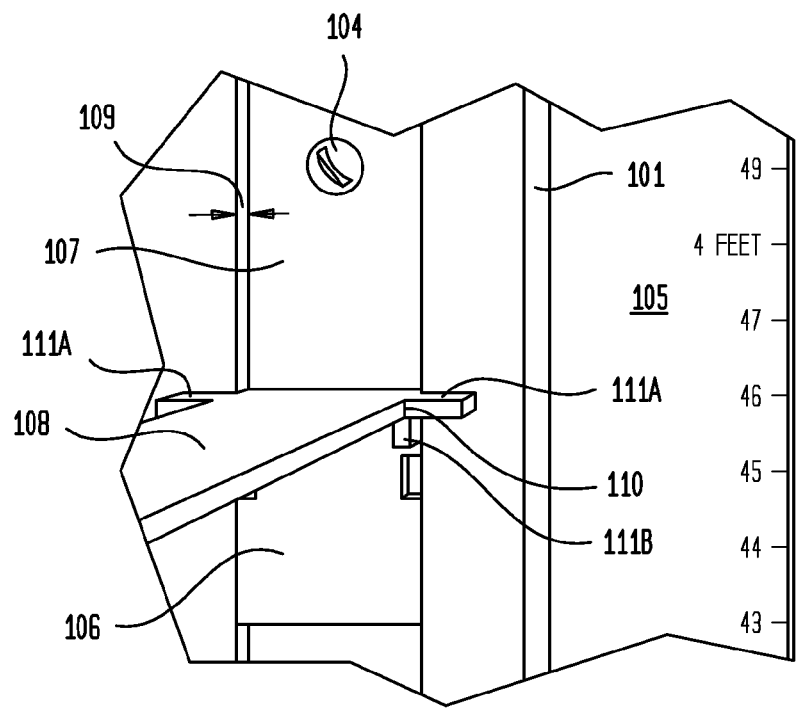
FIG. 3 is a right side perspective illustration of the example height measurement system shown in FIG. 1.

As illustrated in FIG. 3, the slide track 101 may define a travel groove 107 or slot with a slot depth 109, and, in the illustrated version, the slide mount portion 106 has a slide mount thickness that substantially matches that of the slot depth. For example, the corresponding slot depth 109 and slide mount thickness, is advantageously no more than about 0.5 inches, and in another example no more than 0.25 inches. Such a configuration may be implemented to promote compactness of the overall height measuring gauge and to minimize the degree to which it protrudes from the vertical surface, particularly when the gauge plank 108 is not deployed for use.

Figure 5:
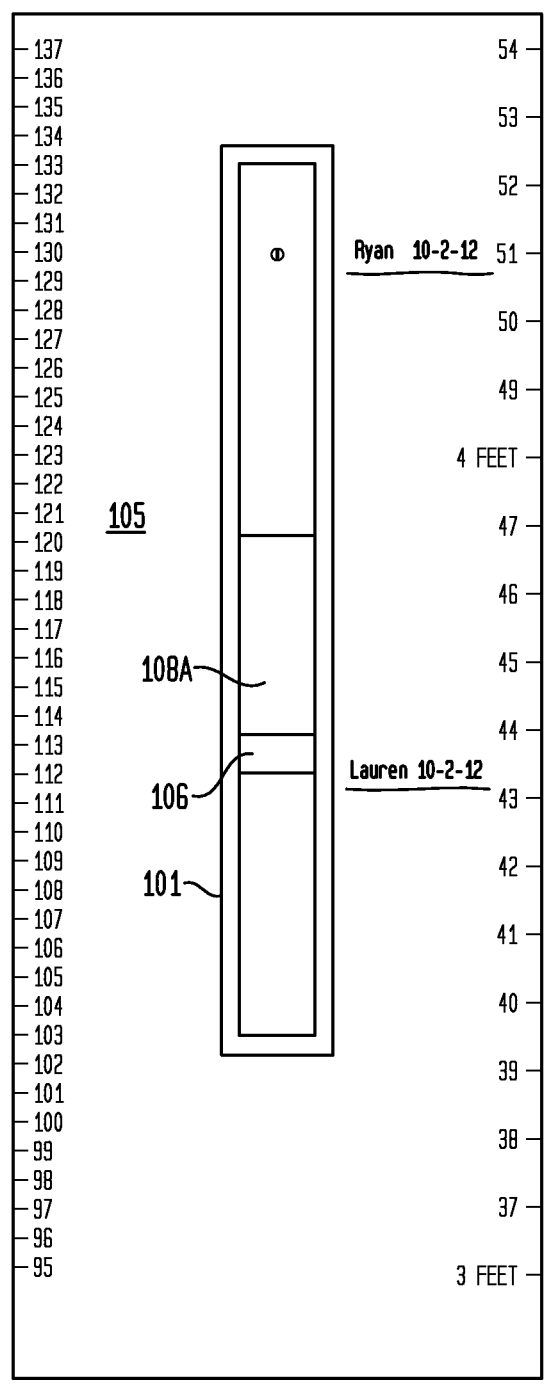
FIG. 5 is a perspective illustration of the example height measurement system shown in FIG. 1, with the gauge element adjusted to a different height setting and with the gauge plank in the folded-down, storage position.
Figure 6:
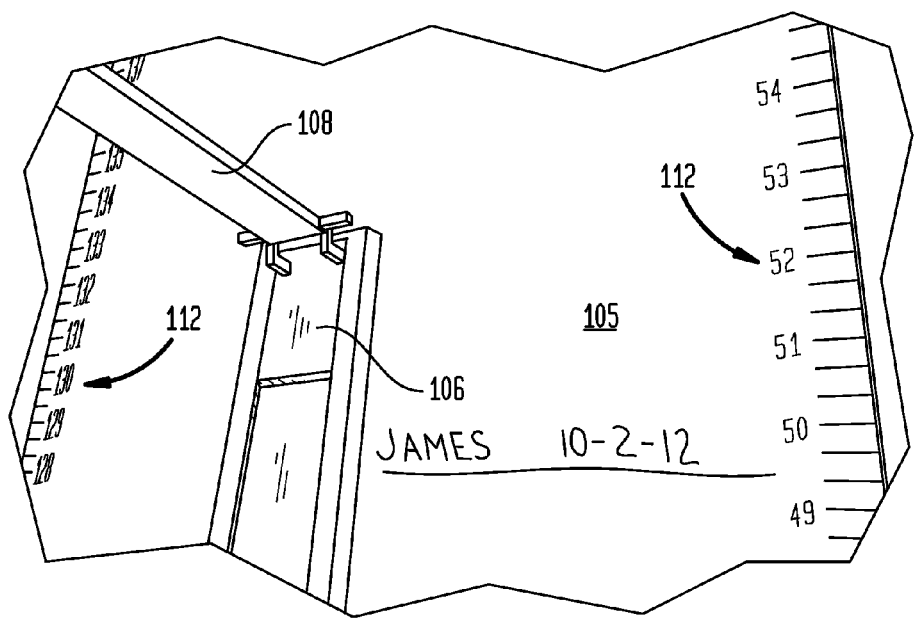
FIG. 6 is another right perspective illustration of the example height measurement system shown in FIG. 1, with the gauge plank of the height gauge in the folded-out, operative position.

The slide mount 106 may have yet other features. For example, the slide mount portion and the slide track 101 may be reciprocally beveled to aid retention of the slide mount 106 within the slide track. This is best illustrated in FIG. 6. For example, the slide track may protrude from an inner portion at an angle toward the top portion; and the slide mount may be beveled in an opposite direction (i.e., narrower on top and angled down toward the base such that the edges of the slide mount fit under the bevel formed in the slide track 101). Other configurations may also be used, such as reciprocally rounded (instead of beveled), and/or provision of a rail portion on the slide mount 106 that is retained within the slide track 101; and/or otherwise configured to enable slidable retention of the slide mount 106 in the slide track 101. Furthermore, as illustrated in FIG. 5, the length of the slide mount portion 106 may match or exceed the slide track 101 length to allow a greater range of heights to be measured while still maintaining an engagement between the slide mount portion and the slide track over the adjustment range. Such an engagement helps to assure the appropriate alignment of the gauge plank during a height measurement.

Figure 4:
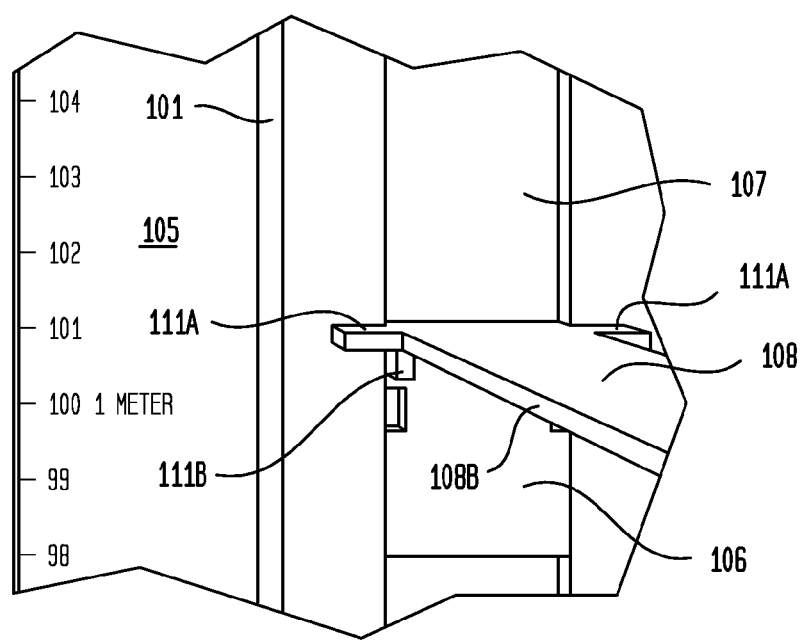
FIG. 4 is a left side perspective illustration of the example height measurement system shown in FIG. 1.

Again referring to FIG. 3, the gauge plank 108 may be hingedly mounted to an upper end of the slide mount portion 106, e.g., via a plank hinge 110. Further, as shown in FIGS. 4 and 5, the gauge plank 108 may be rotatable between a first plank position and a second plank position. The first plank position may be substantially parallel to the vertical surface, as shown in FIG. 5 108A. The second plank position may be substantially perpendicular to the slide mount portion, as shown in FIG. 4 108B.

In an example, the first plank position (FIG. 5 108A) places the gauge plank substantially flush to the vertical surface. The second plank position (FIG. 4 108B), when used in conjunction with the slidable nature of the height measuring device, may permit contact with the top of a head of an individual whose height is being measured, as shown in FIG. 2.

As shown in FIGS. 3 and 4, the plank hinge 110 may include a pair of right angle arm units 111A and 111B. In this example, each respective right angle arm unit has a first arm portion 111A and a second arm portion 111B. Each respective first arm portion 111A is pivotally mounted to the upper end of the slide mount portion, while each respective second arm unit 111B is mounted to an opposing plank edge.

The right angle arm units may be configured to move (e.g., pivot) into a folded, non-protruding position when the gauge plank is in its first plank position (e.g., the folded position shown in FIG. 5). The right angle arm units may be further configured to provide support and appropriate alignment of the gauge plank when the gauge plank is in its second plank position (e.g., the operative, height-measurement position shown in FIGS. 3 and 4).

Other aspects may be associated with the region of the plank hinge 110. By way of illustration, the upper end of the slide mount portion 106 may include squared or rounded edges (instead of the beveled edges) on the remainder of the slide mount portion 106. These squared edges may facilitate appropriate operation of the plank hinge 110.

By way of further illustration, a T-shaped end member may be incorporated as part of the gauge plank 108. The T-shaped end member may have the same thickness as the rest of the gauge plank 108, but extends substantially perpendicular from either edge thereof. Such a T-shaped end member can be provided to facilitate alignment of a ruler (or straight-edge or other measurement device, not shown) relative to a given height position. Accordingly, the T-shaped end member may promote an accurate marking of a given height upon the backing sheet 105. Additionally, the T-shaped end member may provide a connection surface for the respective right angle arm units of the plank hinge 110.

It is noted that when the gauge plank 108 is a first or folded plank position, the gauge plank 108, the slide mount portion 106, and the slide track 101, may protrude not more than about 0.5 inches from the vertical surface 102. Such a configuration promotes the compactness of the overall height measuring gauge and minimizes the degree to which it protrudes from the vertical surface. This may be particularly desirable when the device is not being deployed or used for a height measurement. As such, the height measuring device is substantially flush with the vertical surface upon which it is mounted when not deployed.

Figure 7:
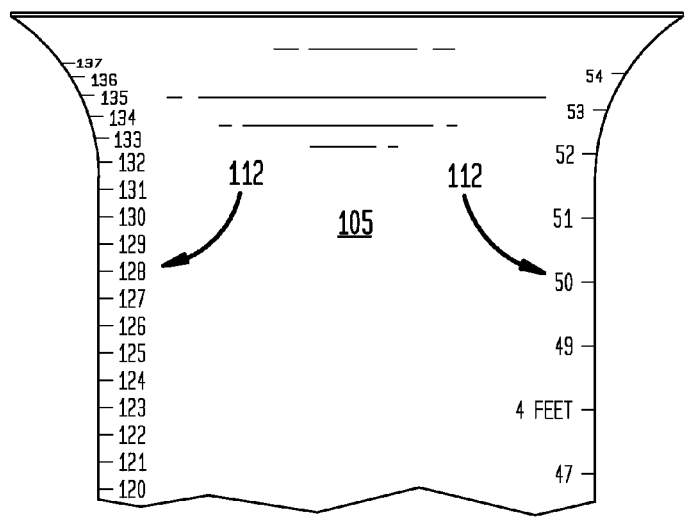
FIG. 7 is a perspective illustration of the backing element associated with the example height measurement system.

FIGS. 6 and 7 show aspects of an example backing sheet 105 of the height measuring system. In this example, the backing sheet 105 is configured for mounting to the vertical surface and for being moved or carried. The backing sheet defines at least one viewable height measurement scale 112, with the at least one height measurement scale being substantially vertically aligned so as to facilitate a height measurement. A given height measurement scale may, for example, be presented in English and/or metric linear units.

The backing sheet 105 may include a plastic sheet material. For example, the plastic sheet material may be entirely made of plastic or may incorporate a paper laminate (not expressly shown), in which the printed portion (e.g., the one or more measurement scales) is printed on the paper portion, with plastic coating one or both sides of the paper.

In another example, the plastic sheet material may include a bi-plastic laminate (not shown), with material being printed on a first sheet of plastic material and with a second sheet of plastic material then covering that first sheet. In any of these examples, whether the plastic sheet material is a unitary or composite structure, the plastic sheet material may be advantageously sized the approximate thickness of paper, ranging for example from the thickness of notebook paper to that of cardstock. But in any case, the thickness may be selected such that it is sufficient enough to promote durability handling, yet thin enough to be flexible for, e.g., rolling or folding for transport and/or storage.

In an example, the backing plastic sheet material 105 is capable of being written upon with at least one of temporary ink (e.g., water colors or dry-erase) and permanent ink, such as to allow marking of names, heights, and/or dates. Other marking devices may also be used, such as pencils. Between such markings (as added by the user) and the one or more height measurement scales provided originally with the backing sheet 105, the backing sheet 105 is thus able to act as an effective height tracking chart for one or more members of a family (e.g., as shown in FIG. 5).

As shown in FIG. 7, the sheet material 105 may be capable of being rolled (or folded, not shown), allowing for easy storing and/or for rolling out enough of the sheet material as needed to mark individuals' heights. Further, the sheet material 105 may be capable of being at least temporarily mounted to a vertical surface, such as by tape or another adhesive means (not shown).

Of course, with the backing sheet being interposed between a wall or other vertical surface 102 and the height measuring gauge, any screws or other fasteners used to mount the height measuring gauge would inherently need to extend through the backing sheet, as well and thereby help mount it to the wall or other vertical surface. Further, the sheet material 105 may incorporate a water color or other background print (not shown) to improve the aesthetics of the background sheet. Indeed, the user may even add their own artwork and/or stickers to the backing sheet 105.

It is noted that the examples shown and described are provided for purposes of illustration and are not intended to be limiting. Still other examples are also contemplated.

The invention claimed is:

1. A height measuring system, comprising:
a slide track to be vertically aligned and mounted to a vertical wall surface;
a height measuring gauge, including:
a slide mount portion slidably mounted within the slide track, the slide mount portion configured to travel substantially parallel to the vertical surface; and
a gauge plank hingedly mounted to the slide mount portion, the gauge plank rotatable between a first plank position and a second plank position, the first plank position being substantially parallel to the vertical surface and the second plank position being substantially perpendicular to the slide mount portion; and
a flat backing sheet configured for flush wall mounting along a length of the backing sheet on the vertical wall surface between the height measuring gauge and the vertical wall surface, the backing sheet further configured to be collapsed, rolled, and folded, and
wherein the slide track is mounted by a fastener through the backing sheet and into the vertical wall surface.

2. The height measuring system of claim 1, wherein the slide track is provided with at least one elongate fastener for mounting the slide track to the vertical wall surface.

3. The height measuring system of claim 1, wherein the slide mount portion of the height measuring gauge is movable through a range of linear positions such that the gauge plank attached thereto can accordingly be used to measure a range of heights.

4. The height measuring system of claim 1, wherein the gauge plank is hingedly mounted to the slide mount portion such that, when the gauge plank is in the first plank position, the gauge plank is essentially flush with the slide mount portion.

5. The height measuring system of claim 1, wherein the gauge plank defines a flat contact surface, the flat contact surface being capable of contacting a head of a person being measured when the gauge plank is in the second plank position.

6. The height measuring system of claim 1, wherein, when the gauge plank is in the first plank position, the gauge plank, the slide mount portion, and the slide track are configured in such a manner that the gauge plank protrudes not more than about 0.5 inches from the vertical surface.

7. The height measuring system of claim 1, wherein the backing sheet defines at least one viewable height measurement scale, the at least one height measurement scale being vertically aligned so as to facilitate a height measurement.

8. The height measuring system of claim 7, wherein a chosen height measurement scale is presented in one of English and metric linear units.

9. The height measuring system of claim 1, wherein the backing sheet is comprised of a plastic sheet material.

10. The height measuring system of claim 9, wherein the plastic sheet material is capable of being written upon with at least one of temporary ink and permanent ink.

11. The height measuring system of claim 9, wherein the plastic sheet material is configured to be only temporarily mounted to the vertical wall surface.

12. The height measuring system of claim 1, further comprising a plank hinge with a pair of right angle arm units, each respective right angle arm unit has a first arm portion and a second arm portion, each respective first arm portion is pivotally mounted to the upper end of the slide mount portion, while each respective second arm unit is mounted to an opposing plank edge.

13. A height measuring system comprising:
a rectangular slide track having a groove extending lengthwise through the slide track and a circular hole through which an elongate fastening device may be fitted therethrough, the slide mount not being greater than 0.5 inches in depth;
a rectangular slide mount formed to fit in the groove of the slide track, wherein the slide mount and the slide track form a flat surface when the slide mount is fitted within the groove of the slide track;
a gauge plank connected via a hinge to a top end of the slide mount, such that the gauge plank will lie flush with the slide mount in a closed position and perpendicular to the slide mount in an open position; and
a flat rectangular backing sheet formed from a flexible material having a writing surface for temporary or permanent ink, the backing sheet further configured to be collapsed, rolled, and folded, and the backing sheet having at least one visible measurement scale, and wherein the rectangular slide track is mounted by a fastener through the backing sheet and into a vertical wall surface.

14. The height measurement system of claim 13, wherein the backing sheet has two visible measurement scales, one of English and metric linear units.

15. The height measurement system of claim 13, a T-shaped end member incorporated as part of the gauge plank, the T-shaped end member having a same thickness as a rest of the gauge plank, but extending substantially perpendicular from either edge thereof.

16. The height measurement system of claim 15, wherein the T-shaped end member facilitates alignment of a measurement device relative to a given height position to promote an accurate marking of a given height upon the rectangular backing sheet, and the T-shaped end member providing a connection surface for respective right angle arm units of the hinge of the gauge plank.

17. The height measurement system of claim 13, wherein an upper end of the slide mount has squared edges, and beveled edges on a remainder of the slide mount, wherein the squared edges facilitate operation of the plank hinge.

18. A height measuring method, comprising:
vertically aligning and mounting a slide track to a vertical wall surface;
adjusting a height measuring gauge, including:
   a slide mount portion slidably mounted within the slide track, the slide mount portion configured to travel substantially parallel to the vertical surface; and
   a gauge plank hingedly mounted to the slide mount portion, the gauge plank rotatable between a first plank position and a second plank position, the first plank position being substantially parallel to the vertical surface and the second plank position being substantially perpendicular to the slide mount portion;
providing a collapsible, rollable, and foldable backing sheeting; and
mounting the flat backing sheet along a length of the backing sheet and flush on the vertical wall surface between the height measuring gauge and the vertical wall surface, and
wherein the slide track is mounted by a fastener through the backing sheet and into the vertical wall surface.

19. The height measuring system of claim 18, wherein the engagement between the slide mount portion and the slide track assures appropriate alignment of the gauge plank during a height measurement.

\* \* \* \* \*